(12) United States Patent
Boffelli et al.

(10) Patent No.: US 12,715,244 B2
(45) Date of Patent: Aug. 25, 2026

(54) BRAKING ASSEMBLY FOR A VEHICLE WHEEL

(71) Applicant: POLI S.R.L, Camisano (IT)

(72) Inventors: Roberto Boffelli, Camisano (IT); Jose Manuel Saraiva Carvalho, Cologne (DE); Paolo Lunghi, Camisano (IT); Marco Cremona, Camisano (IT)

(73) Assignee: POLI S.r.l., Camisano (IT)

( * ) Notice: Subject to any disclaimer, the term of this patent is extended or adjusted under 35 U.S.C. 154(b) by 322 days.

(21) Appl. No.: 18/461,919

(22) Filed: Sep. 6, 2023

(65) Prior Publication Data

US 2024/0083196 A1 Mar. 14, 2024

Related U.S. Application Data

(60) Provisional application No. 63/375,301, filed on Sep. 12, 2022.

(51) Int. Cl.
*B60B 27/00* (2006.01)
*F16D 65/02* (2006.01)
*F16D 65/12* (2006.01)

(52) U.S. Cl.
CPC ........ *B60B 27/0052* (2013.01); *F16D 65/121* (2013.01); *B60B 2320/10* (2013.01);
(Continued)

(58) Field of Classification Search
CPC ............ B60B 27/0052; B60B 2320/10; B60B 2900/50; B60B 2900/115; B60B 17/00;
(Continued)

(56) References Cited

U.S. PATENT DOCUMENTS 4,004,661 A * 1/1977 Airheart ................ F16D 65/123
188/218 XL
4,006,803 A * 2/1977 Klein .................... F16D 65/124
188/218 XL
(Continued)

FOREIGN PATENT DOCUMENTS

DE 284954 A5 * 11/1990
DE 102020112874 A1 11/2020
(Continued)

OTHER PUBLICATIONS

Office Action received for related EA Patent App. No. 202392235 dated Dec. 12, 2023 (4 pages).
(Continued)

*Primary Examiner* — S. Joseph Morano
*Assistant Examiner* — Eva L Comino
(74) *Attorney, Agent, or Firm* — K&L Gates LLP

(57) ABSTRACT

A braking assembly can include a brake disc that may have a first segment and a second segment arranged to form a portion of a friction ring. The assembly can also include a fastening assembly that can include a first bracket that may have a first face configured to contact the wheel web and a second face opposite to the first face. The fastening assembly may also include a fastening device with a sliding pin disposed around a shaft. The first bracket may be disposed around the sliding pin and secured between the wheel web and a first component of the fastening device. The shaft may be disposed through the wheel web and the first bracket. The first component can contact the second face of the first bracket and may compress the first bracket against the wheel web to secure the first segment and the second segment to the wheel.

19 Claims, 14 Drawing Sheets

(52) U.S. Cl.
CPC ..... *B60B 2900/115* (2013.01); *B60B 2900/50* (2013.01); *F16D 2065/1316* (2013.01); *F16D 2065/138* (2013.01); *F16D 2065/1392* (2013.01); *F16D 2250/0084* (2013.01)

(58) Field of Classification Search
CPC . B60B 17/0006; F16D 65/121; F16D 65/123; F16D 2065/131; F16D 2065/136; F16D 2065/1368; F16D 2065/1372; F16D 2065/138; F16D 2065/1392; F16D 2250/0084; B60T 1/065; B61H 5/00
USPC .......................................................... 301/6.8
See application file for complete search history.

(56) References Cited

U.S. PATENT DOCUMENTS

| | | | | | |
|---|---|---|---|---|---|
| 5,101,940 | A * | 4/1992 | Mungo | F16D 65/124 | 188/218 XL |
| 5,788,026 | A * | 8/1998 | Poli | F16D 65/121 | 188/218 XL |
| 8,967,341 | B2 | 3/2015 | Niessner et al. | | |
| 2004/0031651 | A1* | 2/2004 | Lehmann | F16D 65/12 | 188/218 XL |
| 2016/0076613 | A1* | 3/2016 | Boffelli | F16D 65/123 | 188/218 XL |

FOREIGN PATENT DOCUMENTS

| | | | | | |
|---|---|---|---|---|---|
| EP | 0014483 | A1 * | 8/1980 | F16D 65/123 |
| EP | 0564942 | A1 * | 10/1993 | F16D 65/124 |
| EP | 3795853 | A1 * | 3/2021 | B60B 17/00 |
| EP | 3795853 | B1 | 5/2021 | |
| GB | 1495518 | A * | 12/1977 | F16D 65/124 |
| JP | 2008157400 | A * | 7/2008 | |
| RU | 2184043 | C2 | 6/2002 | |
| RU | 2637698 | C2 | 12/2017 | |
| RU | 2644821 | C2 | 2/2018 | |
| TW | 201542948 | A * | 11/2015 | F16D 65/122 |
| WO | 2014169196 | A1 | 10/2014 | |

OTHER PUBLICATIONS

Search Report received for related EA Patent App. No. 202392235 dated Dec. 7, 2023 (5 pages).

* cited by examiner

BRAKING ASSEMBLY FOR A VEHICLE WHEEL

CROSS-REFERENCE TO RELATED APPLICATIONS

This application claims priority to U.S. Provisional Application No. 63/375,301 (filed 12 Sep. 2022), the entire disclosure of which is incorporated herein by reference.

BACKGROUND

Technical Field

The subject matter described relates to a braking assembly for a vehicle system.

Discussion of Art

The braking assemblies of a vehicle may include brake discs having a friction ring with a friction surface. The friction ring may be secured to a wheel web of a wheel of the rail vehicle. When a brake cylinder is actuated, brake linings are applied to the friction surface of the friction ring to provide a braking force for the wheel. In this manner, the brake disc transmits braking torque to the wheel to decelerate and/or stop rotation of the wheel.

The braking process can result in the creation of a significant amount of thermal energy (e.g., heat) that provides constraints for the design of the brake assembly. For example, the friction ring may undergo thermal expansion because of the generated heat. As a result, segmented brake rings may be used that have numerous individual ring segments fastened to one another to account for the thermal expansion. Still, a desire remains to reduce the number of segments, while providing a secure coupling when forming the brake disc.

BRIEF DESCRIPTION

A braking assembly that can include a brake disc. The brake disc may have a first segment and a second segment arranged to form a portion of a friction ring. The assembly can also include a fastening assembly that may be configured to couple the first segment and the second segment to a wheel web of a wheel. The fastening assembly can include a first bracket that may have a first face configured to contact the wheel web and a second face opposite to the first face. The fastening assembly may also include a fastening device with a sliding pin disposed around a shaft. The fastening device may be configured to allow movement of the sliding pin relative to the first bracket. The sliding pin can be configured to thermally expand to engage the wheel web during braking. The first bracket may be disposed around the sliding pin and configured to be secured between the wheel web and a first component of the fastening device. The shaft may be disposed through the wheel web and the first bracket. The first component of the fastening device can contact the second face of the first bracket and may be configured to compress the first bracket against the wheel web to secure the first segment and the second segment to the wheel.

Another braking assembly may be provided with a brake disc. The brake disc can have a first segment and a second segment arranged to form a portion of a friction ring and a fastening assembly for coupling the segments to a wheel. The fastening assembly may include a first bracket that can have a first face configured to contact a wheel web and a second face opposite the first face. The fastening assembly may also have a second bracket with a third face that may be configured to contact the wheel web and a fourth face opposite the third face. The fastening assembly may also have a fastening device with a sliding pin disposed around a shaft and configured to allow movement of the sliding pin relative to the first bracket and the second bracket. The shaft can be disposed through the first bracket, wheel web, and the second bracket. The fastening device can also have a first component that may engage the second face of the first bracket and can extend away from the second face. The fastening device can have a second component that may engage the fourth face of the second bracket and may extend away from the fourth face. The fastening device can be configured to compress the first bracket and second bracket against the wheel web.

A method may be provided that can include coupling a first segment to a second segment to form an opening. The first segment and the second segment can form a portion of a friction ring of a brake disc. The method can also include locating a fastening assembly between the first segment and the second segment within the opening. The fastening assembly can include a bracket and a fastening device that may be at least partially disposed through the bracket and extending to a securing bracket. The method can also include compressing a wheel web of a wheel between a first face of the bracket and the securing bracket with a component of the fastening device disposed within the bracket to secure the first segment and the second segment to the wheel.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the subject matter described herein relate to a braking assembly that can include a segmented braking disc that may be segmented into multiple separate segments. In some examples, the braking disc may be segmented into four segments, but alternatively may be segmented into two, three, or five or more segments. The segments can be secured together and to the wheel by fastening assemblies. The fastening assemblies can include first brackets and second brackets that engage a wheel web. The fastening assemblies each can include fastening assemblies that may be disposed through the first bracket and second bracket on either side of the wheel web to compress the first bracket and second bracket against the wheel web. In addition to providing fastening assemblies for each segment, fastening assemblies can be provided at the perimeter of each segment such that a fastening assembly provides compressive forces against the wheel web of two adjacent or neighboring segments to provide additional securing force.

Figure 1:
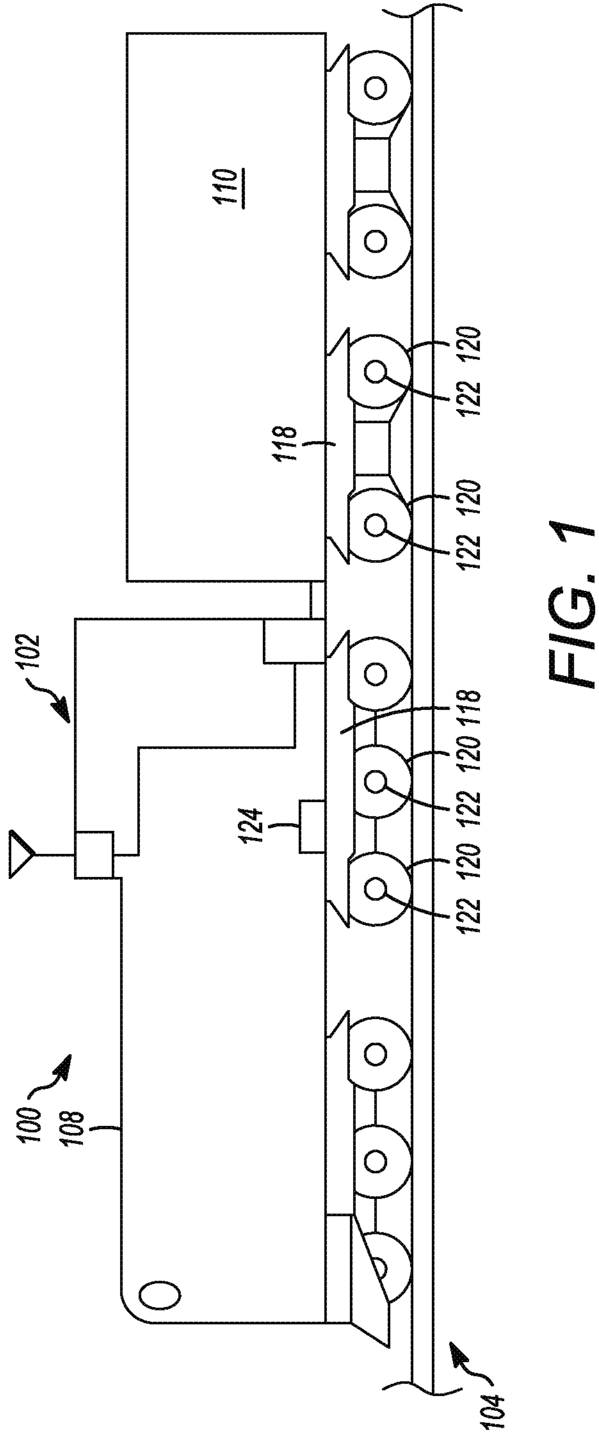
FIG. 1 illustrates a block schematic diagram of one example of a vehicle system.

FIG. 1 illustrates a schematic diagram of one example of a vehicle system 100 that may include a control system 102. The vehicle system may travel along a route 104 on a trip from a starting or departure location to a destination or arrival location. The vehicle system may include a propulsion-generating vehicle 108 and a non-propulsion-generating vehicle 110 that can be mechanically interconnected to one another to travel together along the route. The vehicle system may include at least one propulsion-generating vehicle and optionally, one or more non-propulsion-generating vehicles. Alternatively, the vehicle system may be formed of only a single propulsion-generating vehicle, multiple propulsion-generating vehicles, a single non-propulsion-generating vehicle, or multiple non-propulsion-generating vehicles. The vehicles included in the vehicle system may be mechanically coupled with each other or may be mechanically separate (but coordinate movements with each other so that the separate vehicles travel together, such as in a convoy).

The propulsion-generating vehicle may generate tractive efforts to propel (for example, pull or push) the vehicle system along routes. The propulsion-generating vehicle can include a propulsion subsystem, such as an engine, one or more traction motors, and/or the like, which operate to generate tractive effort to propel the vehicle system.

In the example of FIG. 1, the vehicle may include wheels 120 that engage the route and at least one axle 122 that couples left and right wheels together. Optionally, the wheels and axles may be located on one or more trucks or bogies 118. Optionally, the trucks may be fixed-axle trucks, such that the wheels can be rotationally fixed to the axles, so the left wheel rotates the same speed, amount, and at the same times as the right wheel. In one embodiment, the vehicle system may not include axles, such as in some mining vehicles, electric vehicles, etc.

The vehicle system may also include a braking assembly 124 that may be coupled to at least one of the wheels of the vehicle system. The braking assembly may include a brake disc that can be segmented into individual segments to form a friction ring. In one example, the friction ring may have only four individual segments with each segment coupled to two other neighboring segments by plural fastening assemblies. Alternatively, the friction ring may be formed of a different number of the segments.

Figure 2:
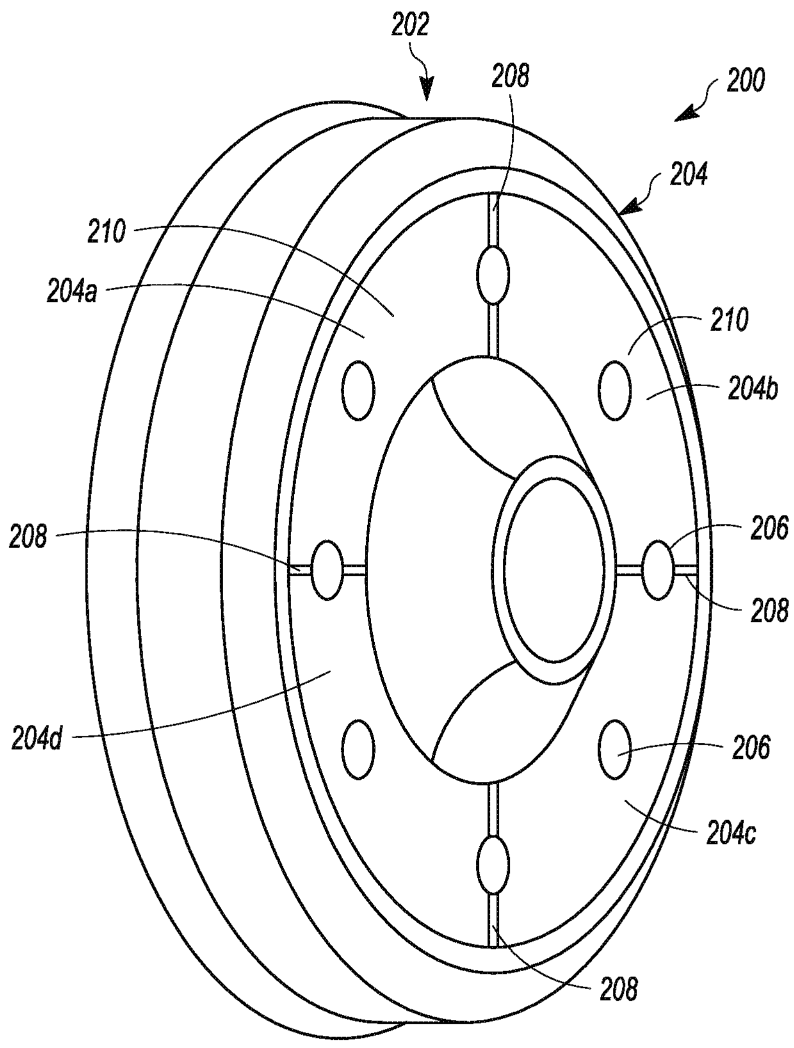
FIG. 2 illustrates a perspective view of one example of a braking assembly.

FIG. 2 illustrates an example braking assembly 200 that has been placed on a wheel 202. In one example, the braking assembly may include a brake disc 204 that can be segmented into separate segments, such as a first segment 204A, a second segment 204B, a third segment 204C, and a fourth segment 204D. The segments may be coupled together by fastening assemblies 206 to form a friction ring. In one example, each of the segments can include a friction surface that may engage the wheel to slow or stop rotation of the wheel, where the segments may engage and contact the wheel and apply a braking torque on the wheel. Alternatively, one or more (but less than all) of the segments may not include the friction surface. Each segment can be separated from the neighboring segments by channels 208. A fastening assembly may secure the adjacent or neighboring segments together and secure the segments to the wheel. Fastening elements may also be disposed in a body 210 of each segment to provide additional coupling force.

FIGS. 3 through 6B illustrate an example brake disc 300 and individual segments 302 of the brake disc. In one example, the brake disc of FIGS. 3 through 6B may be the brake disc shown in FIG. 2. Each individual brake disc may include a friction surface 304 and fin elements 306. The friction surface can be used for engaging a braking lining to provide torque on the wheel to decelerate or stop the wheel. The fin elements may be radially elongated fins that can be longer generally or substantially along radial directions extending outward from the rotation axis of the wheel. In the illustrated example, the fin elements may include curved portions that do not extend along the radial directions, but that can be longer along or parallel to these radial directions than other, non-radial directions. The fin elements may increase inertia of the brake disc by preventing or reducing tendencies of the brake disc to rotate or move relative to the vehicle.

Figure 3:
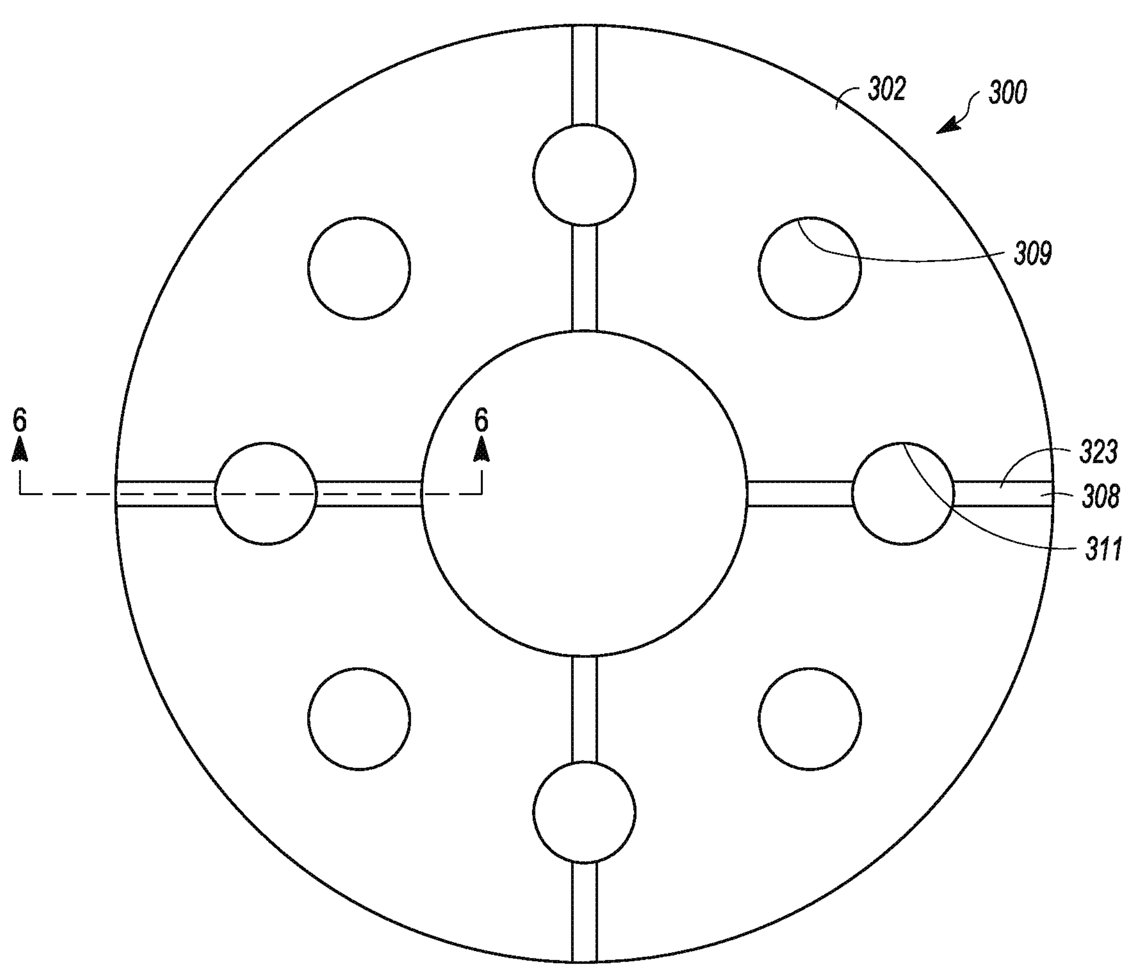
FIG. 3 illustrates a sectional view of one example of a braking assembly.
Figure 4A:
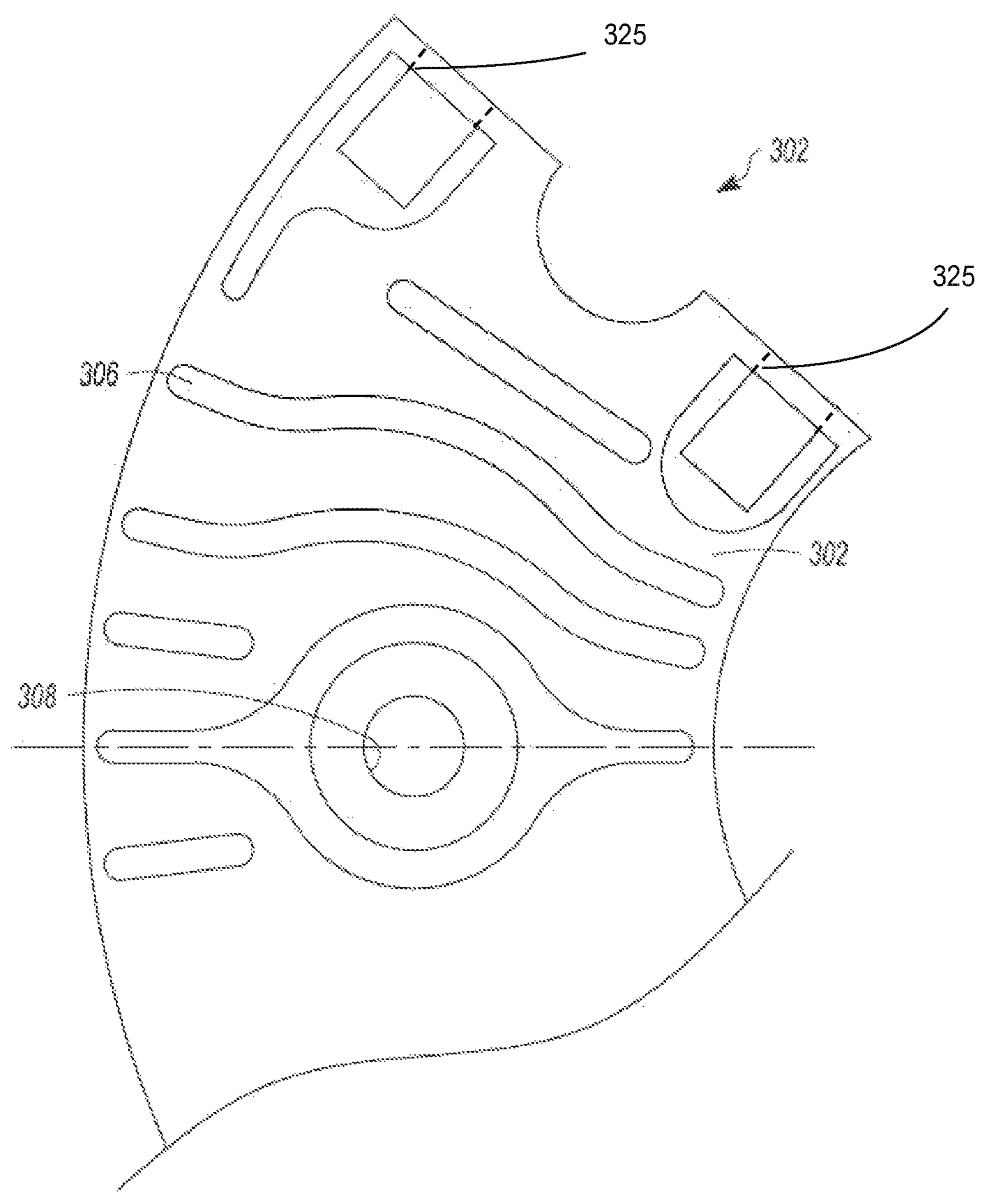
FIG. 4A illustrates a perspective view of one example of a portion of a braking assembly.
Figure 4B:
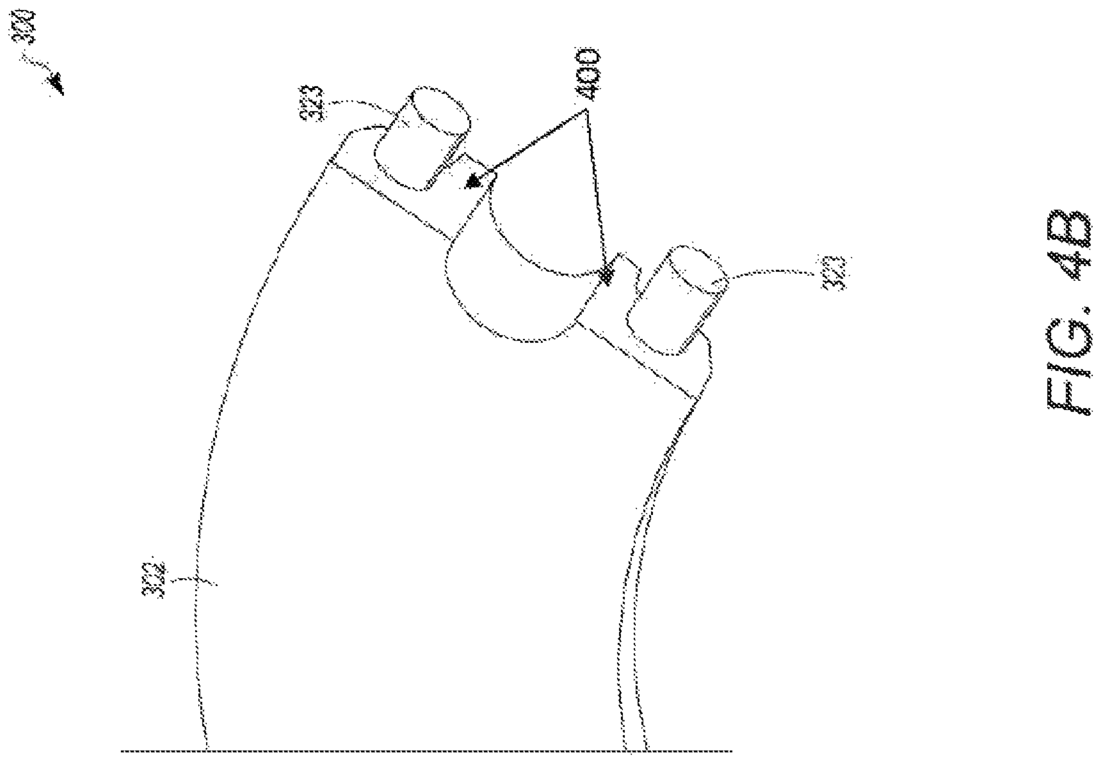
FIG. 4B illustrates a perspective view of one example of a portion of a braking assembly.
Figure 4C:
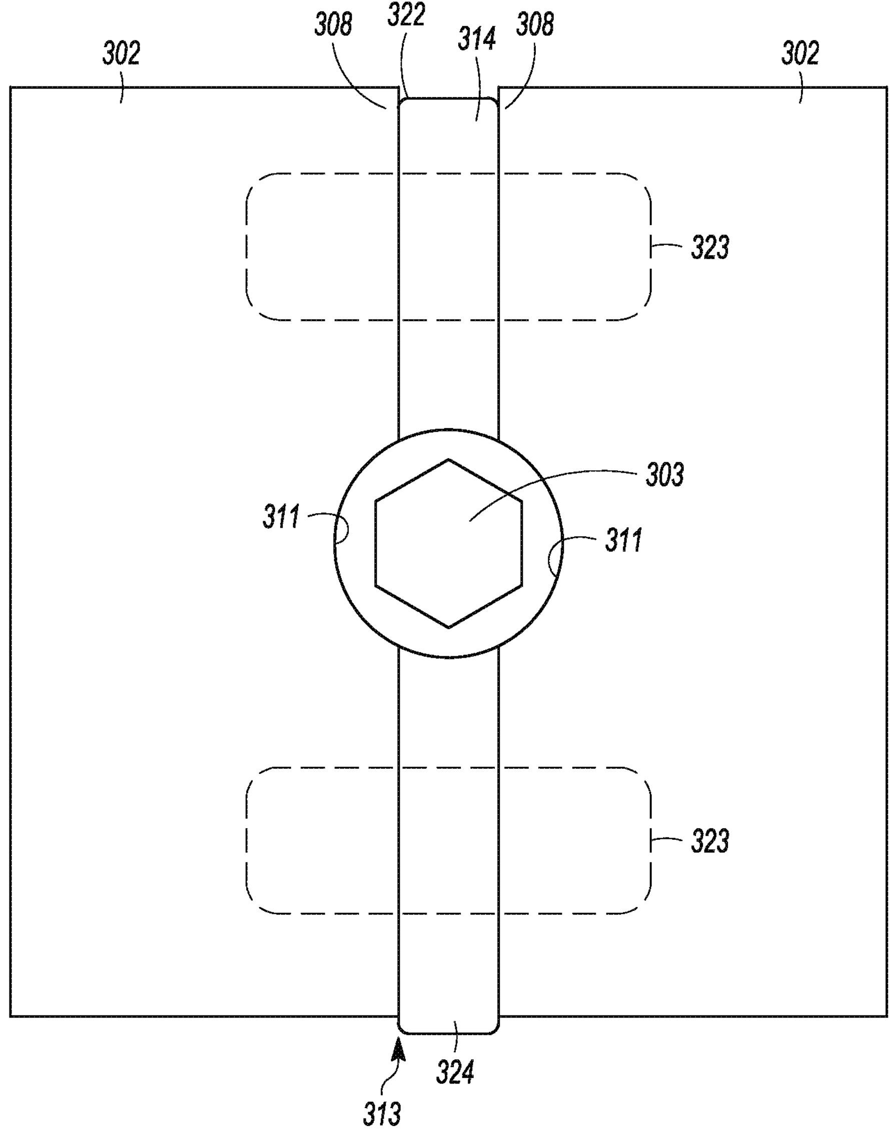
FIG. 4C illustrates a front plan view of one example of a portion of a braking assembly.
Figure 5:
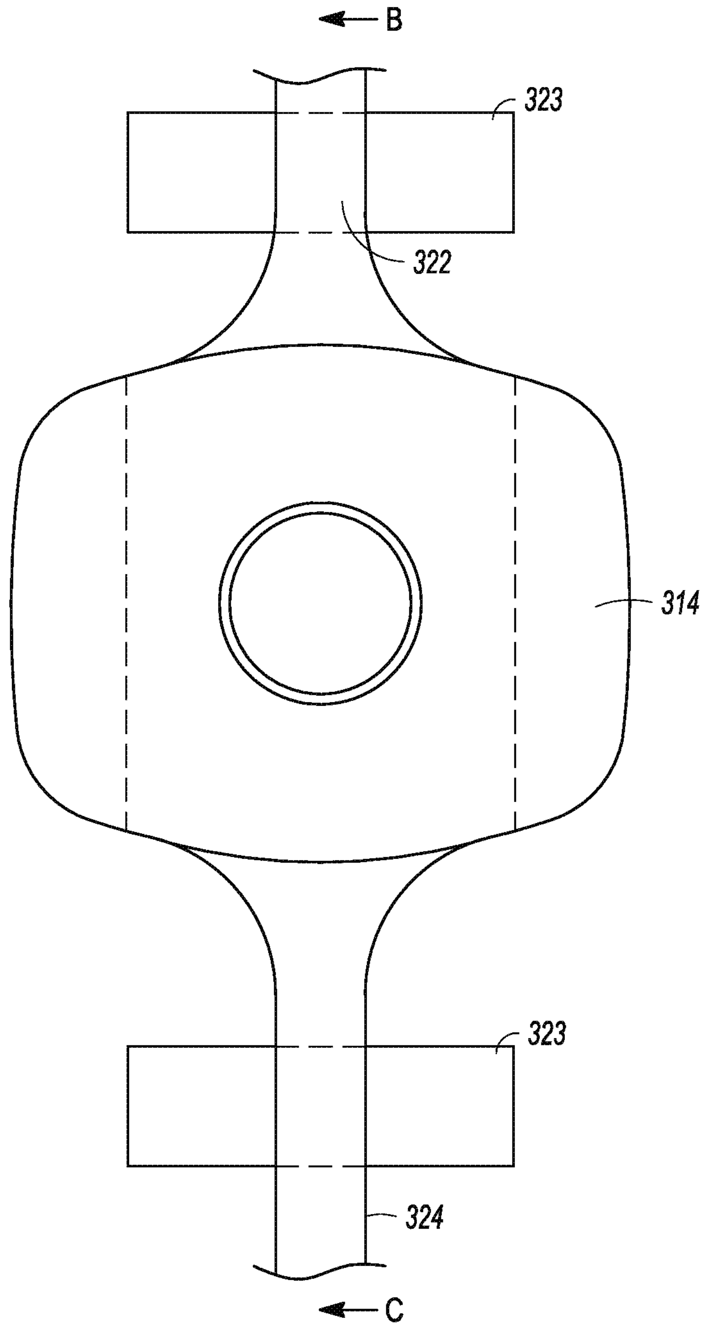
FIG. 5 illustrates a perspective view of one example of a portion of a braking assembly.

Each segment may also include one or more channels 308 for receiving fastening assemblies 303. In particular, each segment can include an opening 309 for receiving a fastener, and partial openings 311 at each end of the segment that may be adjacent to another segment. The partial openings meet at the channel, and a fastening assembly 313 (shown in FIG. 6A) can be placed for providing additional force for coupling the segments together. For example, the openings 309 may be surrounded by the body of the segment, while the partial openings may be partially surrounded by the body of the segment (with each partial opening defining half or less than half of the entire opening). The partial openings in neighboring segments may face each other while the segments may be disposed next to each other, as shown in FIG. 3. As a result of the fastening assembly, fewer brake segments may be required, thereby potentially reducing the required components.

Each segment also may include segment fasteners 323 that, in one example, can be pin elements that extend through the channel and may be received within corresponding cavities 325 of an adjacent segment. These segment fasteners can be elongated pins that can be oriented in or along circumferential directions extending around the axis of rotation of the wheel. For example, the segment fasteners can be elongated pins protruding from a surface 400 of the segment in directions that may be along or tangential to circumferences around the axis of rotation of the wheel. The surface from which the segment fasteners extend or protrude can be the surface that faces another surface of a neighboring or adjacent segment while the segments can be coupled with each other. Each of the fastening assemblies described herein can be placed within the channel(s) between the segments and can include a first bracket 314 having openings 332 and 336 that can receive the segment fasteners.

Figure 6A:
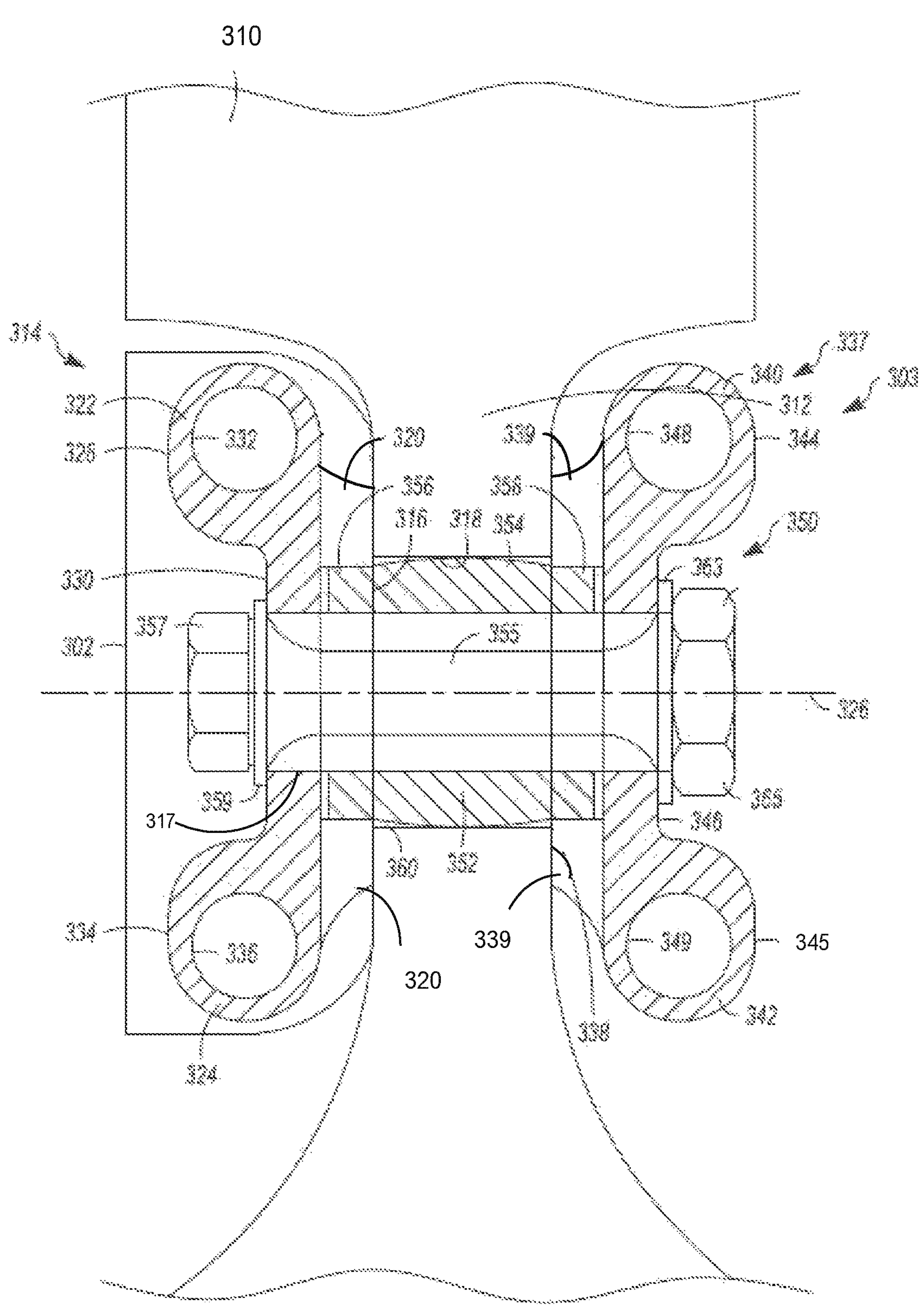
FIG. 6A illustrates a sectional view of one example of a braking assembly.
Figure 6B:
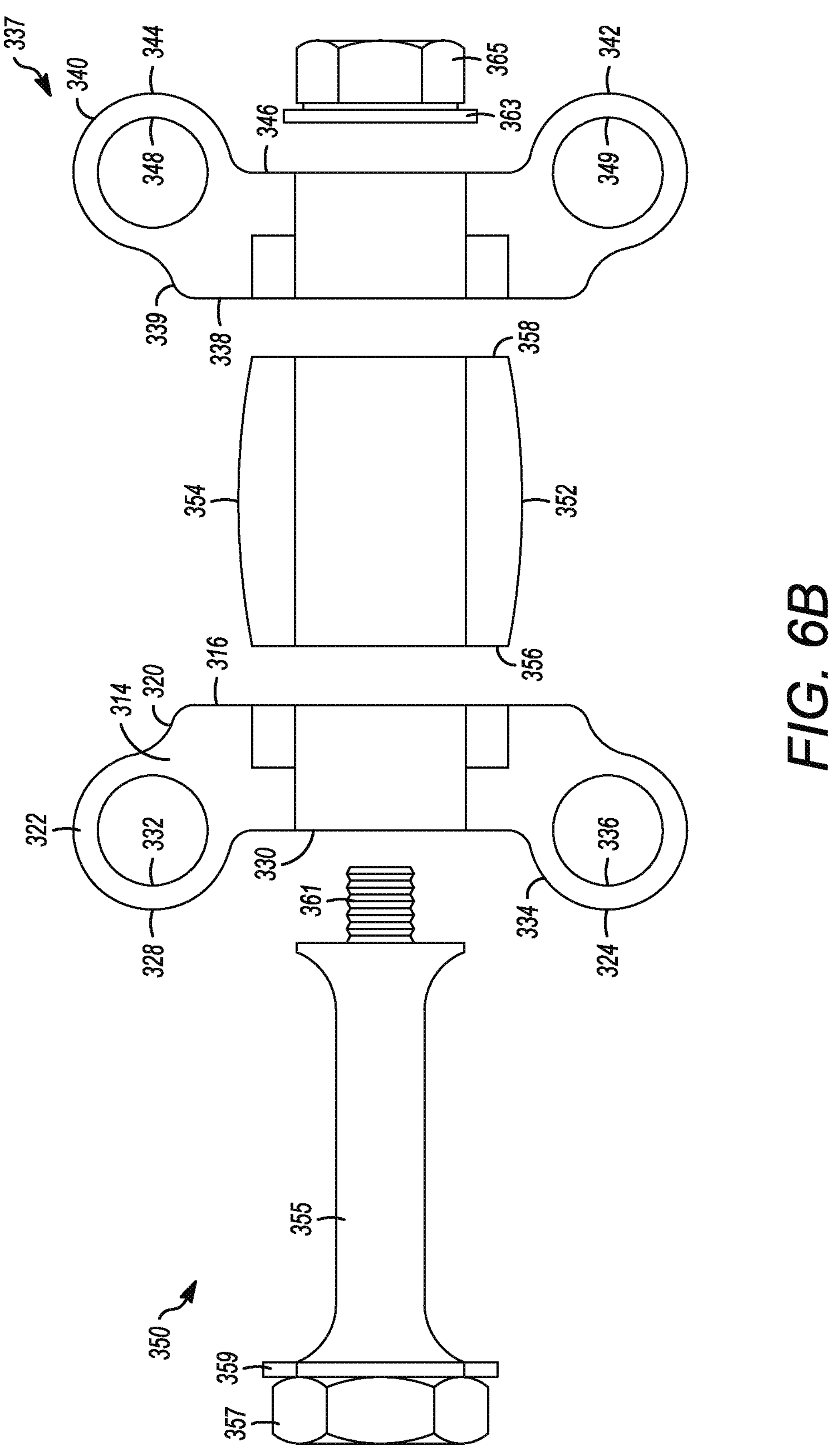
FIG. 6B illustrates an exploded sectional view of one example of a braking assembly.

FIGS. 6A-6B illustrate a segment of a brake disc coupled to a wheel 310, and more specifically to a wheel web 312 via the fastening assembly. The brake disc in one example may be any of the brake discs of FIGS. 2-5. The fastening assembly can include the first bracket. In one example, the first bracket, and/or a second bracket 337 may be of one-piece construction with a segment of the brake disc, or alternatively may be an individual piece that can be separate from the segment.

The first bracket may include a first face 316 that can engage or contact the wheel web and extends along the wheel web. The first face can include a bracket bore 317 that aligns with a wheel bore 318 disposed through the wheel web of the wheel. The first face can have a diameter that may be greater than the wheel bore such that the first face contacts the wheel web.

The first bracket can include a first tapered section 320 that may extend outwardly away from the wheel web and in one example may taper to increase in diameter the further away the tapered section is away from the wheel web. In one example, the first tapered section may taper in a concave manner, while alternatively, the first tapered section may taper in a convex manner. The first tapered section can extend to a first wing 322 and a second wing 324. The first wing and second wing may be spaced from the wheel web and define a location in which a first opening 332 (e.g., within the first wing) and a second opening 336 (e.g., within the second wing) may be located. In particular, the first opening and second opening can each receive the segment fastener of a corresponding segment to couple the segment to the wheel web. Each of the first wing and second wing can be arcuate or circular as illustrated. In other examples, the first wing and second wing can include linear or non-curved edges, and can be rectangular, triangular, square, or the like. In yet another example, the first wing and second wing may have a combination of curved portions and linear portions. The first wing may be symmetrical to the second wing along, about, or across a central axis 326 of the wheel bore. In another example, the first wing may be asymmetrical compared to the second wing.

In the example embodiment illustrated, the first wing can include a first arcuate surface 328 and the second wing similarly can include a second arcuate surface 334. Each arcuate surface can extend from the first tapered section to a second face 330. In particular, in this example, each of the first wing and second wing may be circular, and as such the first arcuate surface and second arcuate surface each extends arcuately until terminating at the second face. The first arcuate surface can define a perimeter of the first wing around the first opening that may terminate at the second face. Similarly, the second arcuate surface can define a perimeter of the second wing around the second opening that can terminate at the second face as well. Thus, the second face may be located between the first wing and the second wing. The second face may be in parallel spaced relation to the first face and can define a flat edge on an outermost surface of the first bracket. In this manner, the flat edge of the second face may be configured to receive and/or engage a portion of a fastening device 350 that may include numerous components such as a washer 359, a head 357 of a bolt, or the like. In one embodiment, the second face can extend across the washer. Alternatively, the second face may extend across the head of the bolt when the washer may not be provided.

The assembly may also include the second bracket. In the illustrated embodiment, the second bracket can be identical in shape and have the same functional components as the first bracket. To this end, the second bracket may be symmetrical to the first bracket on, about, or across a plane oriented perpendicular to the center axis of the wheel bore. In other examples the second bracket can be asymmetrical to the first bracket on, about, or across a plane oriented perpendicular to the center axis of the wheel bore.

In one example, similar to the first bracket, the second bracket may include a third face 338 that can be flat and may engage the wheel web. Within the second bracket and disposed through the third face can be a second bracket bore 335 that aligns with wheel bore and can be configured to receive at least one component of the fastening device. The second bracket may also include a second tapered section 339 that extends from the third face outwardly away from the wheel web and tapers to increase in diameter the further away the second tapered section is away from the wheel web. The tapering may be concave or may be convex.

Figure 9:
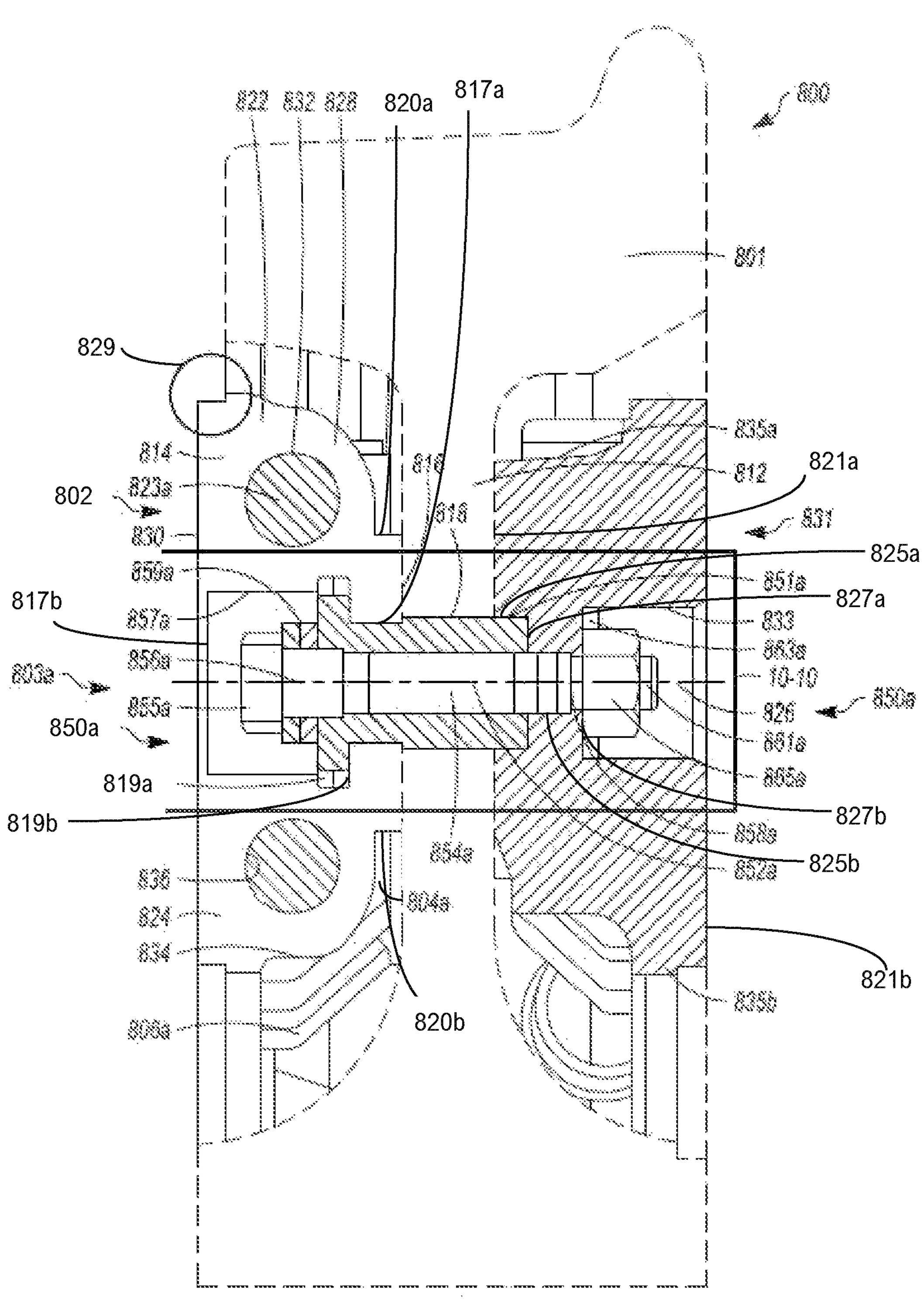
FIG. 9 illustrates a sectional view of one example of the braking assembly along line 9-9 in FIG. 8.
Figure 11:
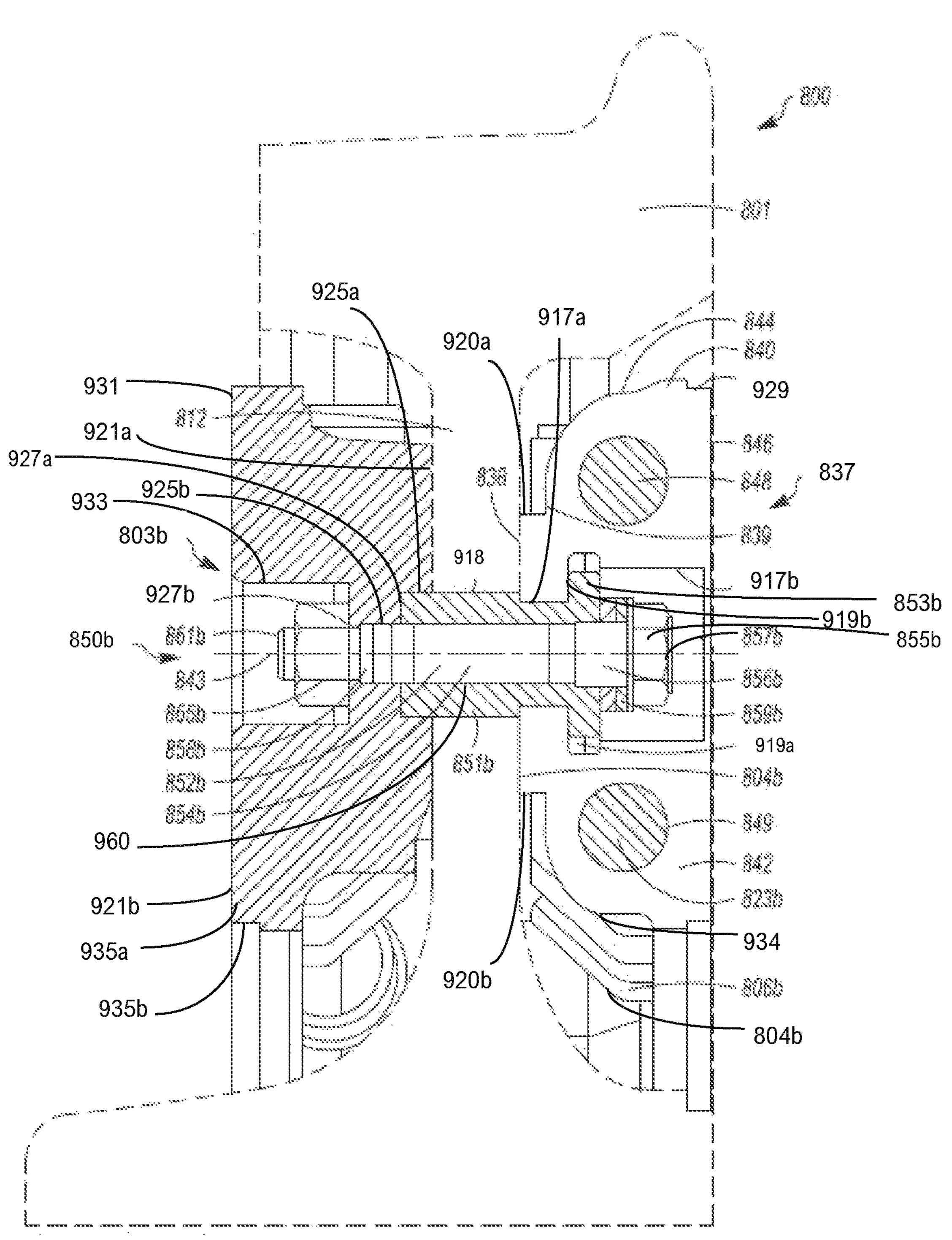
FIG. 11 illustrates a sectional view of the braking assembly along lines 11-11 in FIG. 8.

The second tapered section can extend to a third wing 340 and a fourth wing 342. Similar to the wings (e.g., the first wing and second wing) of the first bracket, each of the third wing and fourth wing can be arcuate or circular. In other examples, the third wing and fourth wing can include linear or flat edges, and can be rectangular, triangular, square, or the like. In yet another example, the third wing and fourth wing may have a combination of arcuate portions and linear portions. To this end, the third wing may be symmetrical to the fourth wing along, about, or across a central axis of the wheel bore. In another example, the third wing may be asymmetrical. The third wing and fourth wing may be spaced from the wheel web and can be configured to define a location in which a third opening 348 (e.g., within the third wing) and the fourth opening 349 (e.g., within the fourth wing) can be located. In particular, the third opening and fourth opening can each receive the segment fasteners of a corresponding segment to couple the segment to the wheel web. Alternatively, the second bracket does not receive a segment fastener and can be utilized only as a securing bracket for providing compression between the first bracket and second bracket. In one example, the second bracket may not have wings, nor include openings (FIGS. 9 and 11). In example embodiments when the third and fourth wing are provided, the third and fourth wings can facilitate gripping for tools for removal in case replacement of a component of the braking assembly may be desired.

In the illustrated embodiment, the third wing can include a third arcuate surface 344 and the second wing similarly can include a fourth arcuate surface 345 where each arcuate surface can extend from the second tapered section to a fourth face 346. In particular, in this example each of the third wing and fourth wing can be circular, and as such the third arcuate surface and fourth arcuate surface extend around the third opening until terminating at the second face. The second face may be located between the third wing and the fourth wing. The fourth face may be in parallel spaced relation to the third face and can define a flat edge on an outer surface of the second bracket. The flat edge of the fourth face may be configured to receive and/or engage a component of a fastening device such as a washer 363 and a nut 365.

Each fastening device can include a sliding pin 352 that can have a central section 354 that has a greater diameter than a first end section 356 and a second end section 358. To this end, the central section can bulge past each of the first end section and the second end section. In addition, the central section may be slightly smaller in diameter than the wheel bore causing an arcuate gap to be provided between the central section and the wheel web. By having the arcuate gap, the central section can expand to engage the wheel web to provide additional securing forces between the brake disc and the wheel under loading conditions while the heat within the wheel increases.

The fastening device also can include a fastening element 355. The fastening element can extend through the first bracket, through the wheel web and through the second bracket. The fastening element may include a head and a washer that may engage the second face of the first bracket. The washer can extend along the second face of the first bracket accordingly. In one example a washer may not be provided, and the head may engage the extend along the second face of the first bracket. In another embodiment, the fastening element, head, and washer can be of one-piece construction, whereas alternatively, each component may be separate from the other component. In yet another example, two of the three components can be secured to one another while the other may be separate.

The fastening element may have a shaft that tapers inwardly from the head and washer to provide a reduced diameter through the first bracket, wheel web, and second bracket. In this manner, the fastening element can be surrounded by the sliding pin such that a fastening gap 360 can be disposed between the fastening element and the sliding pin so the sliding pin and fastening element can move independently of one another. In addition, this can provide additional area for expansion by the sliding pin.

In addition, the shaft also may taper outwardly before a threaded end 361 (FIG. 6B) of the elongated body receives the washer and the nut that can engage the fourth face of the second bracket. As a result of the shaft of the fastening element tapering to increase the diameter of the shaft at each end, an increased diameter may be provided for the head and nut. The increased diameter can result in a greater surface area of the head and nut that compress against the first bracket and second bracket accordingly. By having an increased area against each bracket, the fastening assembly may allow for securing adjacent segments of the brake disc at the gap between the segments. As such, a multi-segment brake disc can be provided with fastening forces to couple to the wheel.

Figure 7:
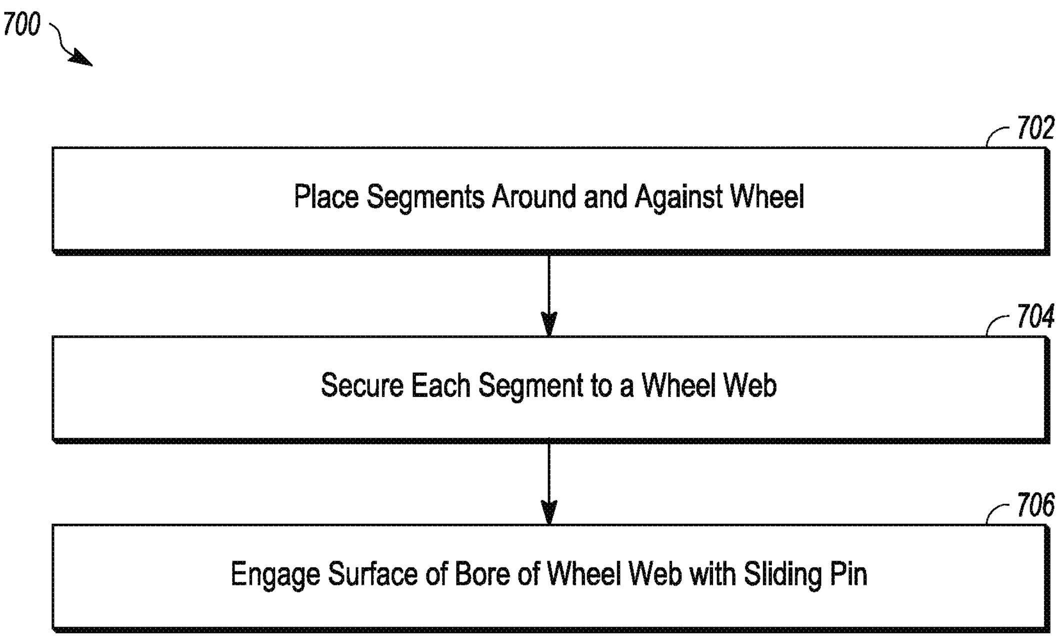
FIG. 7 illustrates a flowchart of one example of a method of securing a brake disc to a wheel.
Figure 8:
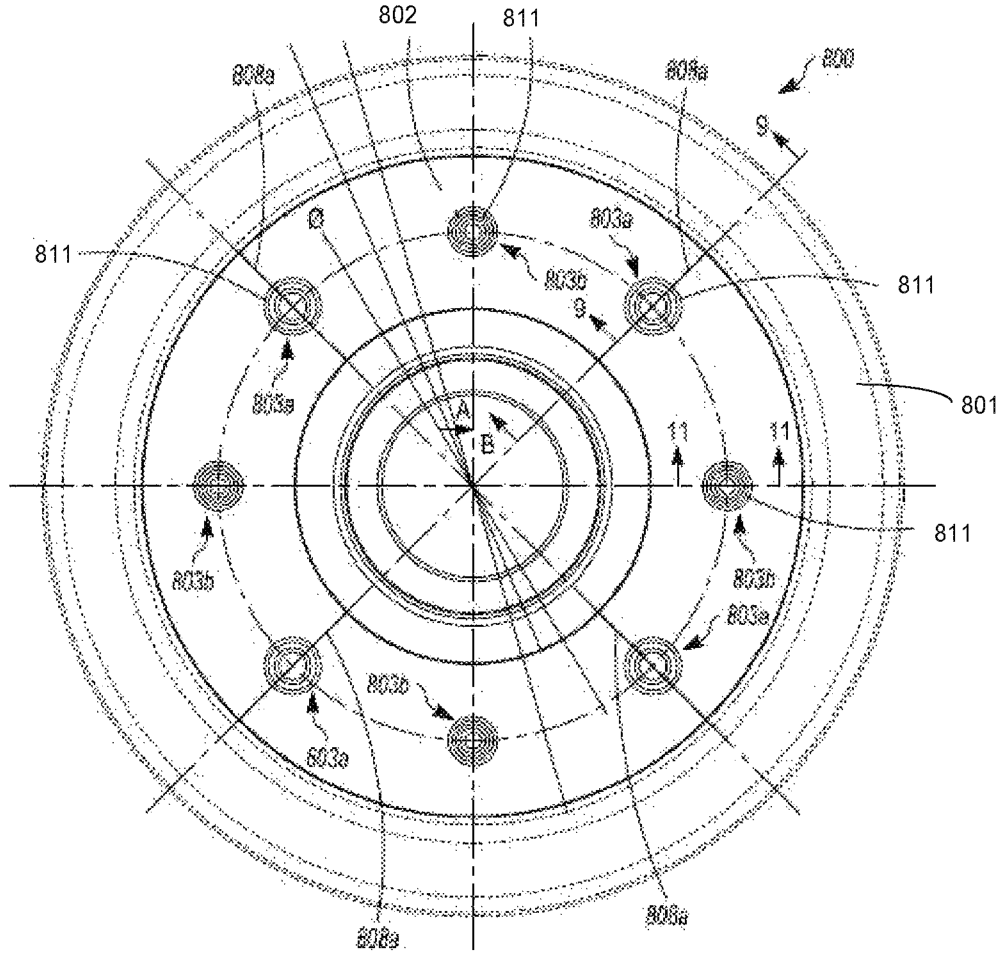
FIG. 8 illustrates a front plan view of one example of a braking assembly.

FIG. 7 illustrates a flowchart of one example of a method 700 for securing a segmented braking disc to a wheel. In one example, the segmented braking disc may be any one of the braking discs illustrated in FIGS. 2-6B. Similarly, the wheel may be any of the wheels illustrated in FIGS. 1-6B.

At step 702, the individual segments may be placed around and against a wheel to form the segmented braking disc. In one example, the individual segments can engage the wheel web and may include a friction surface for providing a braking force for the wheel. To this end, each individual segment can include segment fasteners that extend from the segment and cavities that may receive the segment fasteners. In addition, the segment fasteners may be of size and shape to be disposed through openings of a first bracket of a fastening assembly.

At step 704, plural fastening assemblies secure the segments to the wheel web and to one another. The fastening assemblies in one example may be the fastening assemblies illustrated in FIG. 6A, 9, or 11. The individual fastening assemblies may include a first bracket including a first wing and a second wing where each wing can include an opening for receiving the segment fasteners of an individual segment. In addition, a second bracket can be provided that can be configured to secure the wheel web between the first bracket and second bracket. In particular, the fastening assembly may compress the first bracket and second bracket together to hold them against the wheel web. The fastening assembly may also include a fastening device that may include a sliding pin and a fastening element that can be disposed through a wheel bore. Further, a bracket bore may not engage a surface of the wheel bore under a non-braking condition so that under a non-braking condition the guide can be spaced from the surface of the wheel bore.

At step 706, during a braking condition, the sliding pin may expand, engaging the surface of the wheel bore, and thus the wheel web. Under heated conditions, the sliding pin may increase or expand in size to engage the surface of the wheel bore. In this manner, additional forces are presented to hold the segmented brake disc in place during a braking condition. In this manner, a segmented brake disc can be provided with fastener assemblies that can enhance securing force between segments of the brake disc and the wheel. While multiple segments can be provided, in one example embodiment the segmented brake disc may include only four segments, yet still provide a secure connection by providing the partial opening at the end of each segment so that fastening assemblies described herein may engage more than one segment. In addition, the guide provides supplemental coupling and securing to improve on previous systems.

FIGS. 8-11 illustrate another example embodiment of a braking assembly 800, that can include a wheel 801 and brake discs 802 that can be coupled together with a first fastening assembly 803*a* or a second fastening assembly 803*b*. The brake discs may be separated from one another along sectional lines 808*a* such that cavities can be formed along the sectional lines. In particular, each brake disc segment can include an opening 811 for receiving a first or second fastening assembly. Each brake disc may also include a friction surface 804*a*, 804*b* (FIGS. 9 and 11) and fin elements 806*a*, 806*b* (FIGS. 9 and 11). The friction surface may be used for engaging a braking lining to provide torque on the wheel to decelerate or stop the wheel. Meanwhile, the fin elements, or radial fins may be utilized for increasing inertia of the brake disc. Each segment, similar to the embodiment of FIGS. 2-6B, also may include segment fasteners 823*a*, 823*b* (FIGS. 9 and 11) that in one example can be pin elements that extend through the channel and may be received within corresponding cavities of an adjacent segment. The fastening assemblies described in connection with FIGS. 9-11 can each be placed within the one or more channels between the segments. Each fastening assembly can include a bracket 814 that has openings that can receive the segment fasteners. The bracket can be configured to couple individual segments, and more than one segment, to the wheel.

FIG. 9 illustrates a sectional view of a segment of the brake disc that may be coupled to a wheel web 812 of the wheel via the first fastening assembly. The brake disc in one example may be any of the brake discs of FIGS. 2-6B. The fastening assembly may be similar to the example embodiments of FIGS. 2-6B in that the fastening assembly can include a bracket 814 that may include a first face 816 that may engage or contact the wheel web. In one example, the bracket may be of one-piece construction with a segment of the brake disc, or alternatively may be an individual piece that can be separate from the segment. In the embodiment of FIGS. 8-11, the first face can include a first bracket bore 817*a* that may align with a wheel bore 818 disposed through the wheel web to provide additional space for a fastening device 850*a* of the first fastening assembly. Still, the first face has a diameter that may be greater than the wheel bore such that the first face may contact the wheel web. In addition, the first bracket bore can include a bracket bore cavity 819*a* that may terminate at a first bracket bore flange 819*b*. The first bracket bore may be configured to receive components of the first fastening device. Additionally within the bracket and extending from the cavity can be a second bracket bore 817*b*, also configured to receive components of the first fastening device.

The first face of the bracket can terminate in a first outer surface 820*a* and a second outer surface 820*b* that in the cross-section of FIG. 9 can be represented as edges. The first and second outer surfaces each may extend outwardly away from the wheel web. The first outer surface can extend to a first wing 822 and the second outer surface may extend to a second wing 824. The first and second wings, similar to the embodiment of FIGS. 2-6B, may define a portion of the bracket that can include an opening. In this manner, the first wing may be the portion of the bracket that may define a first opening 832 and the second wing can be the portion of the bracket that can define a second opening 836. In one example, the first wing may be disposed symmetrical to the second wing along a central axis 826 of the wheel bore. In another example, the first wing and second wing can be asymmetrical to one another along the central axis.

In this embodiment, the first wing may include a first arcuate surface 828 that may extend from the first outer surface to a first bracket flange 829 that may extend around the perimeter of the bracket. Similarly, the second wing may include a second arcuate surface 834 that can extend from the second outer surface and can terminate at the first bracket flange. The first bracket flange may terminate at a second face 830 of the bracket. The second face in one example can be in parallel spaced relation to the first face. The second face in this example may not be disposed in the bracket like FIGS. 2-6B but may be an outer surface of the bracket. As a result, the bracket can have a flat outer surface facilitating manufacturing.

In this example embodiment, on the opposite side of the wheel can be a securing bracket 831. The securing bracket can include a third face 821*a* that may engage and extends along the wheel web. In general, the third face can be flat, and disposed through the third face and into the securing bracket may be a first securing bracket bore 825*a*. The first securing bracket bore may include a first securing bracket bore flange 827*a* that partially extends into the first securing bracket. A securing bracket channel 825*b* can connect the first securing bracket bore to a second securing bracket bore 833. In particular, the channel can terminate at a second securing bracket bore flange 827*b* of the securing bracket. The first securing bracket bore, the securing bracket channel, and the second securing bracket bore can each receive components of the first fastening device.

Extending around the first securing bracket bore, the securing bracket channel, and the second securing bracket bore can be a securing bracket body 835*a*. In one example, the securing bracket body can include an arcuate outer surface. In particular, the securing bracket does not receive the segment or the segment fasteners and therefore can have a size and shape for facilitating installation or manufacturing. The securing bracket body in one example can extend into a securing bracket outer flange 835*b*. Such a shape may facilitate grasping of the securing bracket to affix the securing bracket to the wheel. Still, in other examples, other shapes, including rectangular, triangular, or the like could be utilized. The securing bracket body can terminate in a fourth face 821*b* that can extend the length of the securing bracket that can provide additional grip. Still, disposed through the fourth face and into the securing bracket body can be the second securing bracket bore.

Figure 10:
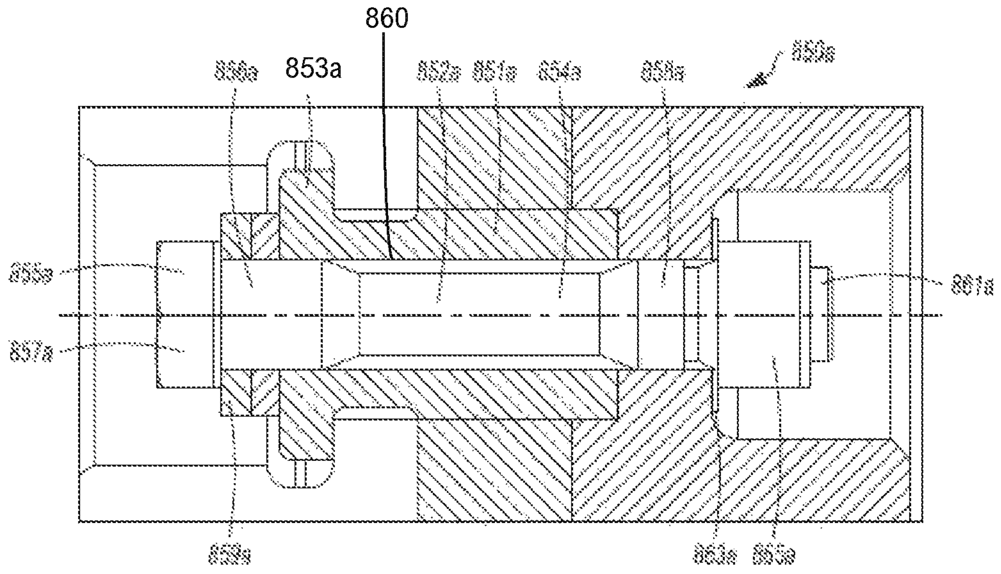
FIG. 10 illustrates a partial sectional view of the braking assembly taken from section 10-10 in FIG. 9.

The first fastening device is illustrated in additional detail in FIG. 10. For the purposes of this application there are several numerals in FIG. 10 that could be provided in FIG. 9, but because of the abundance of numerals already appearing, such numerals have not been shown. Still, each component illustrated in FIG. 10 is similarly considered illustrated in FIG. 9, whether a numeral and lead line have been provided or not. Additionally, there may be several numerals in FIG. 9 that could be provided in FIG. 10, but because of the abundance of numerals already appearing, such numerals have not been shown. Still, each component illustrated in FIG. 9 is similarly considered illustrated in FIG. 10, whether a numeral and lead line have been provided or not.

The first fastening device may include a first sliding pin 851*a* that can receive a second sliding pin 852*a* within a first sliding pin bore 860. The first sliding pin can include a flange 853*a* disposed within the first bracket bore and the flange can engage the first bracket bore flange. From the flange the first sliding pin extends through the wheel web bore and to a second end that may be disposed within the first securing bracket bore and can engage the first securing bracket bore flange. In one example, the first sliding pin can have a T-shape.

In one example, the first sliding pin may surround the second sliding pin. The second sliding pin can include a first end section 856*a* that can be within the second bracket bore of the bracket and may extend within the first sliding pin bore. The first end section may extend into a central section 854*a* that can be disposed through the first sliding pin bore to the securing bracket channel. A second end section 858*a* may extend from the central section in the securing bracket channel and into the second securing bracket bore. In this manner, the combination of the first sliding pin and the second sliding pin can move independently of one another based on the forces exerted on the fastening assembly. In addition each may expand, similar to the sliding pin of the example embodiment of FIGS. 2-6B to provide supplementary force for securing the segment to the wheel.

In addition to the first sliding pin and second sliding pin, the plural fastening device can include a fastening element 855*a*. The fastening element may include a head 857*a* and a washer 859*a* that can engage the flange of the first sliding pin. In this manner, force can be produced from a surface area of the flange of the first slide pin against the first bracket bore flange to compress against the wheel web. This increases the force as compared to embodiment where just the head or washer compress against a face of the bracket. In addition, by placing the force transfer point between the flange of the first slide pin and the first bracket bore flange within the bracket bore cavity, moment forces are reduced compared to bracket arrangements (e.g. FIGS. 2-6B) where the force transfer occurs at an outer surface of the bracket.

The fastening element may also include a threaded end 861*a* that can receive a washer 863*a* and nut 865*a* that can engage the second securing bracket bore flange of the securing bracket. Similar to placing the force transfer point closer to the wheel web within the bracket, the washer and nut can be placed in the second securing bracket bore such that the force transfer point occurs at the second securing bracket bore flange. As a result, moment forces are reduced compared to embodiments (e.g. FIGS. 2-6B) that place the force transfer point against an outer face of the securing bracket. In one example, a second sliding pin may not be provided, and only the fastening element can be provided and disposed through the first sliding pin. In particular, the first end, central, and second end sections may be portions of a shaft of the fastening element. In one example, such a shaft can include similar shapes and features as illustrated in FIGS. 9 and 10. In all, the fastening assemblies can allow for securing adjacent segments of the brake disc at the gap between the segments. As such, a reduced number of segments can be used to provide the required fastening forces to couple the segments to the wheel.

FIG. 11 illustrates a section view of the second fastening assembly. As illustrated, the second fastening assembly may be similar, and in some embodiments identical to the first fastening assembly, only located on the opposite side of the wheel. As shown, the second fastening assembly may include a second bracket 837 with a first face 838 that can engage the wheel web. In one example the bracket may be of one-piece construction with a segment of the brake disc, or alternatively may be an individual piece that may be separate from the segment. In the embodiment of FIGS. 8-11, the first face may include a first bracket bore 917*a* that aligns with a wheel bore 918 disposed through in the wheel web to provide additional space for a fastening device 850*b*. Still, the first face can have a diameter that can be greater than the wheel bore such that the first face contacts the wheel web. In addition, the first bracket bore may include a bracket bore cavity 919*a* that may terminate at a first bracket bore flange 919*b*. To this end, the bracket bore cavity may receive components of the fastening device. Additionally within the second bracket and extending from the cavity can be a second bracket bore 917*b*, also that may be configured to receive components of the fastening device.

The first face of the second bracket may terminate in a first outer surface 920*a* and a second outer surface 920*b* that in the cross-section of FIG. 11 can be represented as edges. The first and second outer surfaces each may extend outwardly away from the wheel web. The first outer surface can extend to a first wing 840 and the second outer surface may extend to a second wing 842. The first and second wings, similar to the embodiment of FIGS. 2-6B, can define a portion of the second bracket that may include an opening. In this manner, the first wing can be the portion of the second bracket that can define a first opening 848 and the second wing can be the portion of the second bracket that may define a second opening 849. In one example, the first wing can be disposed symmetrical to the second wing along a central axis 843 of the wheel bore. In another example, the first wing and second wing may be asymmetrical to one another along the central axis.

In this embodiment, the first wing may include a first arcuate surface 844 that extends from the first outer surface to a first bracket flange 929 that extends around the perimeter of the second bracket. Similarly, the second wing may include a second arcuate surface 934 that extends from the second outer surface may terminate at the first bracket flange. The flange may terminate at a second face 846 of the second bracket. The second face in one example may be in parallel spaced relation to the first face. The second face in this example may not be disposed in the bracket like FIGS. 2-6B, and instead presents an outer surface of the bracket. As a result, the second bracket can have a flat outer surface facilitating manufacturing.

In this example embodiment, on the opposite side of the wheel may be a securing bracket 931. The securing bracket may include a third face 921*a* that can engage and extend along the wheel web. In general, the third face may be flat, and disposed through the third face and into the securing bracket can be a first securing bracket bore 925*a*. The first securing bracket bore may include a first securing bracket bore flange 927*a* that partially extends into the securing bracket. A securing bracket channel 925*b* can connect the first securing bracket bore to a second securing bracket bore 933. In particular, the channel can terminate at a second securing bracket bore flange 927*b* of the second securing bracket. The first securing bracket bore, the securing bracket channel, and the second securing bracket bore can each receive components of the fastening device.

Extending around the first securing bracket bore, the securing bracket channel, and second securing bracket bore can be a securing bracket body 935*a*. In one example, the securing bracket body can include an arcuate outer surface. In particular, the securing bracket may not receive the segment or the segment fasteners and therefore can have a size and shape for facilitating installation or manufacturing. The securing bracket body in one example can extend into a securing bracket outer flange 935*b*. Such a shape may facilitate grasping of the securing bracket to affix the securing bracket to the wheel. Still, in other examples, other shapes, including rectangular, triangular, or the like could be utilized. The securing bracket body may terminate in a fourth face 921*b* that can extend the length of the securing bracket that can provide additional grip. Still, disposed through the fourth face and into the securing bracket body can be the second securing bracket bore.

The fastening device can include a first sliding pin 851*b* that may receive a second sliding pin 852*b* within a first sliding pin bore 960. The first sliding pin can include a flange 853*b* disposed within the first bracket bore and the flange can engage the first bracket bore flange. From the flange the first sliding pin may extend through the wheel web bore and to a second end that may be disposed within the first securing bracket bore and can engage the first securing bracket bore flange. In one example, the first sliding pin can have a T-shape.

In one example, the first sliding pin may surround the second sliding pin. The second sliding pin can include a first end section 856*b* that can be within the second bracket bore of the bracket and may extend within the first sliding pin bore. The first end section may extend into a central section 854*b* that can be disposed through the first sliding pin bore to the securing bracket channel. A second end section 858*b* may extend from the central section in the securing bracket channel and into the second securing bracket bore. In this manner, the combination of the first sliding pin and the second sliding pin can move independently of one another based on the forces exerted on the fastening assembly. In addition, each may expand, similar to the sliding pin of the example embodiment of FIGS. 2-6B to provide supplementary force for securing the segment to the wheel.

In addition to the first sliding pin and second sliding pin, the fastening device can include a fastening element 855*b*. The fastening element may include a head 857*b* and a washer 859*b* that can engage the flange of the first sliding pin. In this manner, force can be produced from a surface area of the flange of the first slide pin against the first bracket bore flange to compress against the wheel web. This increases the force as compared to embodiment where just the head or washer compress against a face of the bracket. In addition, by placing the force transfer point between the flange of the first slide pin and the first bracket bore flange within the bracket bore cavity, moment forces are reduced compared to bracket arrangements (e.g. FIGS. 2-6B) where the force transfer occurs at an outer surface of the bracket.

The fastening element may also include a threaded end 861*b* that can receive a washer and/or a nut 865*b* that can engage the second securing bracket bore flange of the securing bracket. Similar to placing the force transfer point closer to the wheel web within the bracket, the washer and nut can be placed in the second securing bracket bore such that the force transfer point may occur at the second securing bracket bore flange. As a result, moment forces may be reduced compared to embodiments (e.g. FIGS. 2-6B) that place the force transfer point against an outer face of the securing bracket. While illustrated as a bolt with washers and a nut, in other example embodiments other fastening elements may be utilized. In all, the fastening assemblies allow for securing adjacent segments of the brake disc at the gap between the segments. As such, a reduced number of segments are needed to provide the required fastening forces to couple to each wheel.

In one or more embodiments, an assembly can include a brake disc. The brake disc may have a first segment and a second segment arranged to form a portion of a friction ring. The assembly can also include a fastening assembly that may be configured to couple the first segment and the second segment to a wheel web of a wheel. The fastening assembly can include a first bracket that may have a first face configured to contact the wheel web and a second face opposite to the first face. The fastening assembly may also include a fastening device with a sliding pin disposed around a shaft. The fastening device may be configured to allow movement of the sliding pin relative to the first bracket. The sliding pin can be configured to thermally expand to engage the wheel web during braking. The first bracket may be disposed around the sliding pin and configured to be secured between the wheel web and a first component of the fastening device. The shaft may be disposed through the wheel web and the first bracket. The first component of the fastening device can contact the second face of the first bracket and may be configured to compress the first bracket against the wheel web to secure the first segment and the second segment to the wheel.

In one example, the first bracket may include a tapered section that outwardly tapers from the first face into a first wing and a second wing. In one aspect, the first wing may include a first arcuate surface curving from the tapered section to the second face of the first bracket. The second wing can include a second arcuate surface curving from the tapered section to the second face. In another aspect, the first wing may include a first opening, and the second wing may include a second opening. In yet another aspect, the friction ring may also include a third segment coupled to the second segment, and a fourth segment coupled to the third segment. In yet another example, the fastening assembly may engage a segment fastener of the first segment to secure the first segment and the second segment to the wheel.

In one aspect, the first segment may include a friction surface. In another aspect, the first segment can include a fin element. In one example, the fastening assembly can also include a second bracket that may contact the wheel web. In yet another example, the second bracket may include a third face configured to contact the wheel web and a fourth face opposite to the third face. The second bracket may be disposed around the sliding pin and can be configured to be secured between the wheel web and a second component of the fastening device. In yet another aspect, the second component may be a nut that can extend from the second bracket and may contact the fourth face to compress the third face against the wheel web.

In one or more embodiments, an assembly may be provided with a brake disc. The brake disc can have a first segment and a second segment arranged to form a portion of a friction ring and a fastening assembly for coupling the segments to a wheel. The fastening assembly may include a first bracket that can have a first face configured to contact a wheel web and a second face opposite the first face. The fastening assembly may also have a second bracket with a third face that may be configured to contact the wheel web and a fourth face opposite the third face. The fastening assembly may also have a fastening device with a sliding pin disposed around a shaft and configured to allow movement of the sliding pin relative to the first bracket and the second bracket. The shaft can be disposed through the first bracket, wheel web, and the second bracket. The fastening device can also have a first component that may engage the second face of the first bracket and can extend away from the second face. The fastening device can have a second component that may engage the fourth face of the second bracket and may extend away from the fourth face. The fastening device can be configured to compress the first bracket and second bracket against the wheel web.

In one example, the first bracket can be shaped symmetrical to the second bracket. In another example, the first bracket may include a first tapered section that tapers outwardly from the first face into a first wing and a second wing. The first wing may include a first arcuate surface curving from the first tapered section to the second face of the first bracket. The second wing may include a second arcuate surface curving from the first tapered section to the second face. In yet another example, the second bracket may include a second tapered section that can taper outwardly from the third face into a third wing and a fourth wing. The third wing may include a third arcuate surface curving from the second tapered section to the fourth face of the second bracket. The fourth wing may include a fourth arcuate surface curving from the second tapered section to the fourth face. In one aspect, the friction ring can further include a third segment coupled to the second segment, and a fourth segment coupled to the third segment. In another aspect, the fastening assembly can engage a segment fastener of the first segment to secure the first segment and the second segment to the wheel.

In one or more embodiments, a method may be provided that can include coupling a first segment to a second segment to form an opening. The first segment and the second segment can form a portion of a friction ring of a brake disc. The method can also include locating a fastening assembly between the first segment and the second segment within the opening. The fastening assembly can include a bracket and a fastening device that may be at least partially disposed through the bracket and extending to a securing bracket. The method can also include compressing a wheel web of a wheel between a first face of the bracket and the securing bracket with a component of the fastening device disposed within the bracket to secure the first segment and the second segment to the wheel.

In one aspect, the fastening device can include a sliding pin that may have a flange within the bracket and a shaft within the securing bracket. The method can also include moving the sliding pin when braking is not occurring and compressing the wheel web with the bracket with the sliding pin during braking. In one example, the method can also include further engaging the wheel web with the sliding pin using thermal expansion of the sliding pin during the braking.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related.

Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed:

1. An assembly, comprising:

a brake disc comprising:

a first segment and a second segment arranged to form a portion of a friction ring, wherein the first segment and the second segment are disposed circumferentially adjacent to one another; and a fastening assembly configured to couple the first segment and the second segment to a wheel web of a wheel, the fastening assembly including a first bracket having a first face configured to contact the wheel web and a second face opposite to the first face, the fastening assembly including a fastening device with a sliding pin disposed coaxially around a shaft, the fastening device configured to allow movement of the sliding pin relative to the first bracket, the sliding pin configured to thermally expand to engage the wheel web during braking, the first bracket disposed around the sliding pin and configured to be secured between the wheel web and a first component of the fastening device, the shaft disposed through the wheel web and the first bracket, the first component of the fastening device contacting the second face of the first bracket and configured to compress the first bracket against the wheel web to secure the first segment and the second segment to the wheel.

2. The assembly of claim 1, wherein the first bracket includes a tapered section that outwardly tapers from the first face into a first wing and a second wing.

3. The assembly of claim 2, wherein the first wing includes a first arcuate surface curving from the tapered section to the second face of the first bracket, and the second wing includes a second arcuate surface curving from the tapered section to the second face.

4. The assembly of claim 2, wherein the first wing includes a first opening, and the second wing includes a second opening.

5. The assembly of claim 1, wherein the friction ring also includes a third segment coupled to the second segment, and a fourth segment coupled to the third segment.

6. The assembly of claim 1, wherein the fastening assembly engages a segment fastener of the first segment to secure the first segment and the second segment to the wheel.

7. The assembly of claim 1, wherein the first segment includes a friction surface.

8. The assembly of claim 1, wherein the first segment includes a fin element.

9. The assembly of claim 1, wherein the fastening assembly also includes:

a second bracket contacting the wheel web.

10. The assembly of claim 9, wherein the second bracket includes a third face configured to contact the wheel web and a fourth face opposite to the third face; and the second bracket is disposed around the sliding pin and configured to be secured between the wheel web and a second component of the fastening device.

11. The assembly of claim 10, wherein the second component is a nut that extends from the second bracket and contacts the fourth face to compress the third face against the wheel web.

12. An assembly, comprising:

a brake disc comprising:

a first segment and a second segment arranged to form a portion of a friction ring and a fastening assembly for coupling the first segment and the second segment to a wheel, wherein the first segment and the second segment are disposed circumferentially adjacent to one another;

the fastening assembly including a first bracket having a first face configured to contact a wheel web of the wheel and a second face opposite to the first face, the fastening assembly further having a second bracket having a third face configured to contact the wheel web and a fourth face opposite the third face, the fastening assembly further having a fastening device with a sliding pin disposed coaxially around a shaft and configured to allow movement of the sliding pin relative to the first bracket and the second bracket, the shaft disposed through the first bracket, wheel web, and the second bracket, the fastening device also having a first component that engages the second face of the first bracket and extends away from the second face, the fastening device having a second component that engages the fourth face of the second bracket and extends away from the fourth face, and the fastening device is configured to compress the first bracket and the second bracket against the wheel web.

13. The assembly of claim 12, wherein the first bracket is shaped symmetrical to the second bracket.

14. The assembly of claim 12, wherein the first bracket includes a first tapered section that tapers outwardly from the first face into a first wing and a second wing, the first wing including a first arcuate surface curving from the first tapered section to the second face of the first bracket, and the second wing including a second arcuate surface curving from the first tapered section to the second face.

15. The assembly of claim 14, wherein the second bracket includes a second tapered section that tapers outwardly from the third face into a third wing and a fourth wing, the third wing including a third arcuate surface curving from the second tapered section to the fourth face of the second bracket, and the fourth wing including a fourth arcuate surface curving from the second tapered section to the fourth face.

16. The assembly of claim 12, wherein the friction ring further includes a third segment coupled to the second segment, and a fourth segment coupled to the third segment.

17. The assembly of claim 12, wherein the fastening assembly engages a segment fastener of the first segment to secure the first segment and the second segment to the wheel.

18. A method comprising:

coupling a first segment to a second segment to form an opening, the first segment and the second segment forming a portion of a friction ring of a brake disc;

locating a fastening assembly between the first segment and the second segment within the opening, the fastening assembly including a bracket and a fastening device that is at least partially disposed through the bracket and extending to a securing bracket, wherein the fastening device includes a sliding pin having a flange within the bracket and a shaft within the securing bracket; and compressing a wheel web of a wheel between the bracket and the securing bracket with a component of the fastening device disposed within the bracket to secure the first segment and the second segment to the wheel, whereby:

the sliding pin is movable when braking is not occurring; and the wheel web is compressed with the bracket via the sliding pin during braking.

19. The method of claim 18, further comprising:

engaging the wheel web with the sliding pin using thermal expansion of the sliding pin during the braking.

* * * * *